(12) United States Patent
Tan et al.

(10) Patent No.: US 8,367,947 B2
(45) Date of Patent: Feb. 5, 2013

(54) ANTI-GHOSTING KEYBOARD

(76) Inventors: Min-Liang Tan, Singapore (SG); Chern Ann Ng, Singapore (SG)

( * ) Notice: Subject to any disclaimer, the term of this patent is extended or adjusted under 35 U.S.C. 154(b) by 533 days.

(21) Appl. No.: 11/883,915

(22) PCT Filed: Apr. 21, 2006

(86) PCT No.: PCT/US2006/015729
§ 371 (c)(1),
(2), (4) Date: Apr. 23, 2010

(87) PCT Pub. No.: WO2007/123546
PCT Pub. Date: Nov. 1, 2007

(65) Prior Publication Data
US 2010/0200385 A1    Aug. 12, 2010

(51) Int. Cl.
*H01H 13/70* (2006.01)

(52) U.S. Cl. .................. 200/5 A; 200/512; 200/517

(58) Field of Classification Search .............. 200/5 A, 200/512–517; 341/22–25; 345/168, 169
See application file for complete search history.

(56) References Cited

U.S. PATENT DOCUMENTS

| | | | |
|---|---|---|---|
| 4,288,787 A * | 9/1981 | Serras-Paulet | 341/26 |
| 4,568,918 A * | 2/1986 | Edel | 341/24 |
| 5,177,330 A * | 1/1993 | Takahashi et al. | 200/5 A |
| 5,952,629 A * | 9/1999 | Yoshinaga et al. | 200/5 A |
| 6,563,434 B1 * | 5/2003 | Olodort et al. | 341/22 |
| 6,756,555 B2 * | 6/2004 | Lin | 200/512 |
| 6,989,728 B2 * | 1/2006 | Van Zeeland et al. | 335/205 |
| 7,109,892 B2 * | 9/2006 | Owerfeldt | 341/22 |
| 7,123,170 B1 * | 10/2006 | Iacob | 341/26 |
| 2004/0026222 A1* | 2/2004 | Adachi | 200/512 |

* cited by examiner

*Primary Examiner* — Michael Friedhofer
(74) *Attorney, Agent, or Firm* — Andrew G. DiNovo

(57) ABSTRACT

A computer keyboard is disclosed to remediate the phantom key or ghosting problem. Diodes are added to the PCB or contact-receptive membrane to eliminate reverse current, which is responsible for phantom key strikes. These one-way diodes increase the number of possible concurrent combinations that a microcontroller with limited inputs can support.

12 Claims, 2 Drawing Sheets

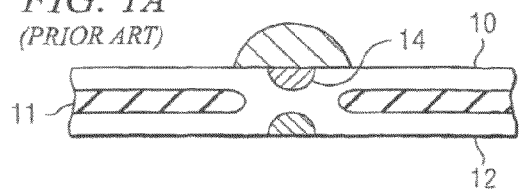
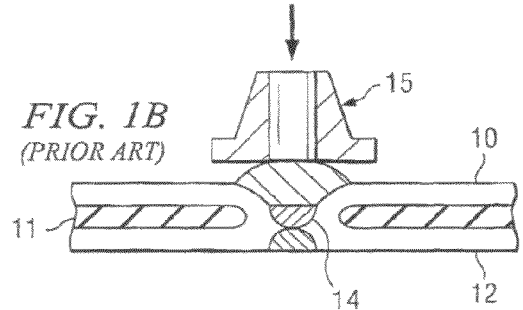
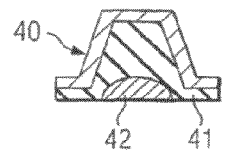
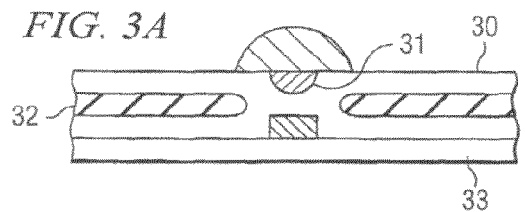
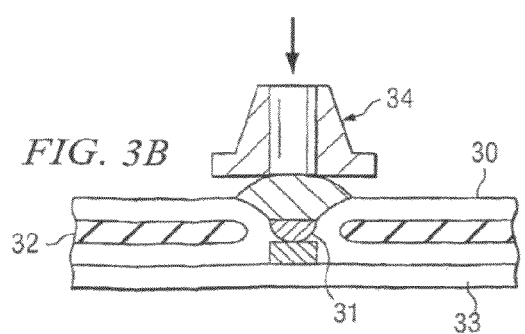
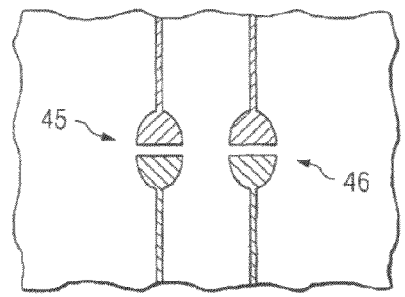

FIG. 2

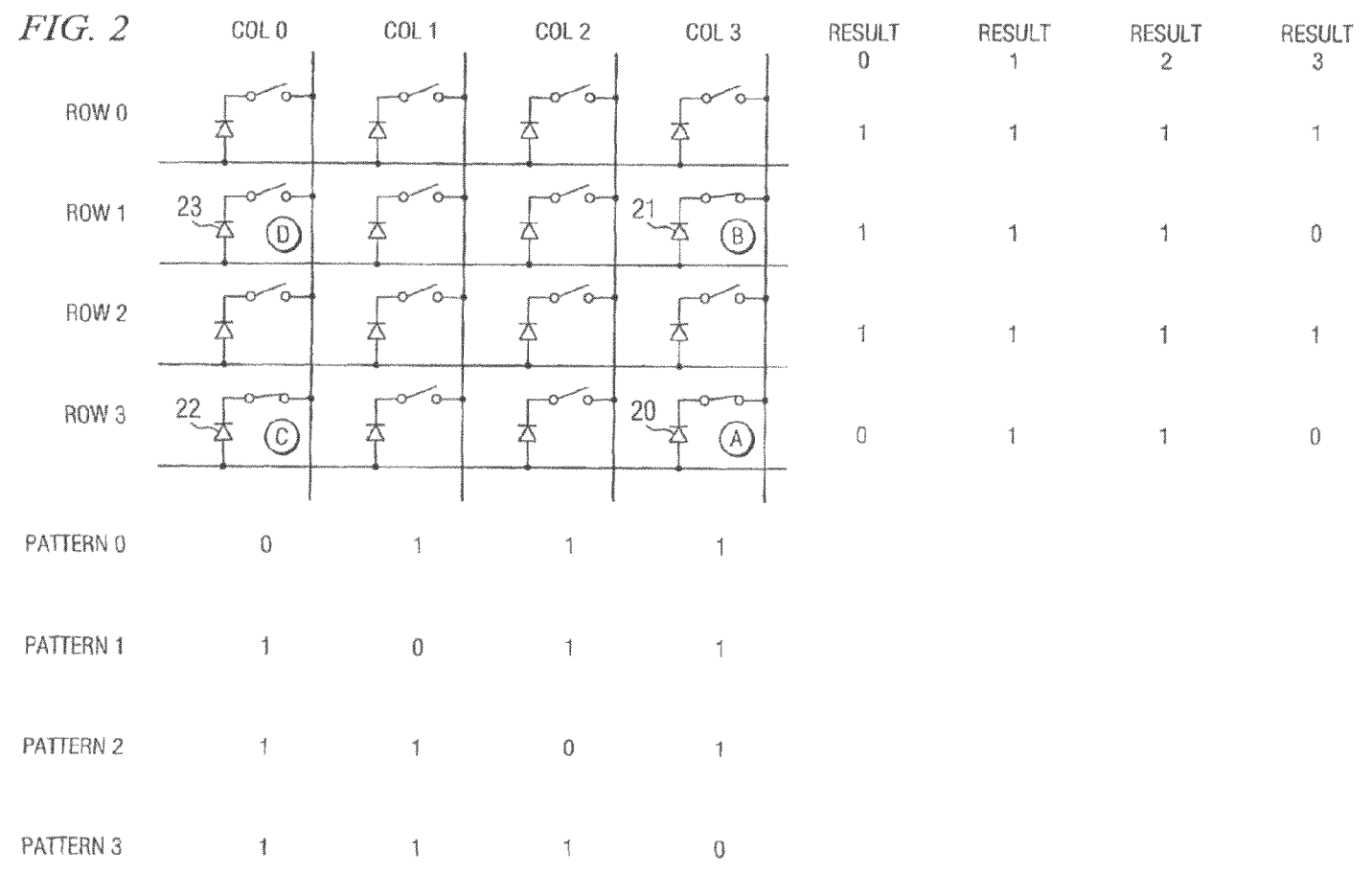

|  | COL 0 | COL 1 | COL 2 | COL 3 | RESULT 0 | RESULT 1 | RESULT 2 | RESULT 3 |
|---|---|---|---|---|---|---|---|---|
| ROW 0 |  |  |  |  | 1 | 1 | 1 | 1 |
| ROW 1 | 23 ⓓ |  |  | 21 ⓑ | 1 | 1 | 1 | 0 |
| ROW 2 |  |  |  |  | 1 | 1 | 1 | 1 |
| ROW 3 | 22 ⓒ |  |  | 20 ⓐ | 0 | 1 | 1 | 0 |
| PATTERN 0 | 0 | 1 | 1 | 1 |
| PATTERN 1 | 1 | 0 | 1 | 1 |
| PATTERN 2 | 1 | 1 | 0 | 1 |
| PATTERN 3 | 1 | 1 | 1 | 0 |

ANTI-GHOSTING KEYBOARD

FIELD OF THE INVENTION

The present invention relates generally to the field of computer peripherals, and more particularly to user input devices such as the computer keyboard.

BACKGROUND OF THE INVENTION

Modern computer keyboards are designed with cost savings as a major factor. To this end, instead of a physical microswitch underneath each computer key (with the attendant cost of each microswitch), keyboards typically have two layers of membranes with circuits printed on them, and an inert non-conducting layer with holes inserted between the two membrane layers. The circuits and holes are arranged in such a way that when a key is depressed, the top and bottom membranes are forced together precisely underneath the key depressed, completing the circuit. The foregoing mechanism is depicted in FIG. 1. Typically, the membranes are made of inexpensive flexible material and are printed with conductive copper alloy strips, and have no logic gates, resistors or any other electronic components.

A microcontroller is connected to the top and bottom membranes and detects the keystrokes by the completion of these circuits and sends the appropriate signal to the host computer regarding which key is pressed.

Typically, such a microcontroller typically does not have the more than 100 inputs associated with a computer keyboard. Instead, most microcontrollers have approximately 10 inputs in order to save costs. This means that there is no dedicated input per key, so the circuit on the membranes is designed in such a way so that typically 2 to 3 inputs are activated each time a key is depressed (e.g., the same combination is of inputs is activated each time the "A" key is depressed).

The microcontroller is accordingly programmed to interpret these combinations as distinct key presses, so even with a limited number of inputs, the microcontroller can recognize all 108 or more keys on a conventional computer keyboard. This combination of microcontroller program and membrane circuit design is commonly known in the industry as a keyboard matrix.

However, a disadvantage to this method is that if three or more keys (or whatever multiples depending on the particular microcontroller and membrane configuration) that have overlapping inputs are depressed at the same time, the microcontroller may be unable to discern based upon the digital input which keys are depressed or if indeed a key has been released.

For example: assuming "A" uses input 1, 2, 3; "B" inputs 2, 3, 4; and "C" inputs 3, 4, 5. If "A" and "C" are actuated together, inputs 1, 2, 3, 4, 5 become active. But "B" also codes to 2, 3, 4. Therefore, the microcontroller cannot determine, based upon the inputs, whether "B" is active or not.

When this happens, the typical response to this overlap is the microcontroller sending a keyboard error signal to the host computer. The keyboard then interprets all keys as released, and the host computer typically sends the user a warning (most commonly as an audible "beep"). The user's input when this error occurs is lost, which is undesirable when entering data quickly, or if playing a computer game or engaged in other applications where timing is important. This issue is known in the industry as the "ghost" or "phantom" key problem.

The matrix system of membranes and microcontrollers in effect introduced a problem that did not previously exist when individual microswitches were used in each keyboard (old "IBM" style keyboards, after the original popularizer of this type of keyboard with individual microswitches). Each microswitch would send a distinct signal to the microcontroller, so there would be no issue of "ghosting." However, this is a relatively expensive alternative which is why the membrane and simple microcontroller combination was initially introduced.

Typically, keyboard manufacturers make educated guesses regarding which keys users are most likely to press simultaneously, and arrange the membrane circuits so that keys that are more likely to be pressed together do not conflict to create a ghosting error. It is impossible, however, to predict how users are going to be using keyboards in every instance, especially with more sophisticated and highly customizable programs (such as graphics editing applications and games, for example) that allow users to determine which keys they want to press simultaneously. For example, a conventional keyboard will not properly recognize a user's depression of more than four keys on a number pad at once, instead producing an error.

SUMMARY OF THE INVENTION

The circuit design of the present invention addresses the phantom key or ghosting problem. Instead of simple conducting lines drawn out in the original matrix, an embodiment of the invention also includes one-way diodes. These one-way diodes greatly increase the number of possible combinations that a microcontroller with limited inputs can support.

Using the present invention, existing microcontroller designs and keyboard construction methods can continue to be used without major changes, allowing economies of scale to be enjoyed with keyboards that do not implement anti-ghosting features.

A person of skill in the art will appreciate that while the specification discusses the present invention in the context of the computer keyboard, other computer input devices, including computer keypads, can also benefit from the approach described herein.

The above summary of the present invention is not intended to represent each embodiment, or every aspect, of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings, wherein:

FIG. 1 is a plan view of top, middle (separator) and bottom membrane, and cross section illustrating a typical depress action.

FIG. 2 is a circuit diagram illustrating how ghosting can be eliminated according to one aspect of the invention.

FIG. 3 is a plan view of the top, middle membrane and bottom PCB and shows a cross section of an actuation action in accordance with the present invention.

FIG. 4 depicts a cross section of a rubber keycap with ferrite or other conductive material.

FIG. 5 is an exemplary circuit with game controller like circuit closure method according to an embodiment of the invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

As summarized above, embodiments of the invention provide a computer input device such as a keyboard with anti-ghosting capability. In prior art keyboards, the controller writes a scan pattern out to the column lines consisting of all 1s and one 0 which is shifted through each column. The result is then read at the row lines. If a 0 is propagated to a row line, then the key at the intersection of that column and row has been pressed. A phantom fourth key press will be detected in a scan matrix if two keys in the same column are pressed, along with a third key pressed in the same row as A or B.

FIG. 1 shows a prior art circuit design showing the top membrane 10, separator membrane 11, and bottom membrane 12. A key 15 is actuated by user, causing downward movement of contact 14, closing the circuit.

In a preferred embodiment of the present invention, in addition to conducting lines drawn out in a matrix implementation, one-way diodes are included. These one-way diodes greatly increase the number of possible combinations that a microcontroller with limited inputs can support. Various types of diodes may be best suited for the particular application, including p-n diodes, Schottky diodes and snap-off or step recovery diodes, among others.

Three exemplary methods of implementation of this anti-ghosting method are disclosed herein. In preferred embodiments of the solutions, existing microcontroller designs and keyboard construction methods can continue to be used without major changes, allowing economies of scale to be enjoyed with keyboards that do not implement anti-ghosting features.

FIG. 2 is a circuit diagram illustrating how ghosting can be eliminated as discussed above. As shown in FIG. 2, diodes 20, 21, 22 and 23 are used to reduce or eliminate reverse current. In connection with FIG. 2, diodes 20, 21, 22 and 23, act to remove reverse current. In the prior art design of FIG. 1, we would anticipate reverse current flow from C to A to B—that is avoided by the present invention. Consequently, there is no phantom key occurrence at D.

In a first embodiment of the invention, instead of a three-membrane configuration, a printed circuit board ("PCB") is used. Referring now to FIG. 3, plan view of top membrane 30, middle separator membrane 32 and bottom PCB 33 are shown. FIG. 3 further depicts a cross section showing how the actuation action would occur, with key 34 and associated contact 31 being depressed to complete a circuit with PCB 33.

The invention in this embodiment can thus combine the low cost membrane and matrix solution with a PCB which has the capability of accepting low cost diodes for each key (as opposed to typically higher-cost microswitches). Consequently, this embodiment is compatible with most existing microcontrollers and does not generally require major changes to the microcontroller firmware.

In another embodiment, instead of the use of any membranes, the existing keys, which typically rely on an elastomeric sheet that forces a key back up after being depressed, are slightly modified with the addition of a small piece of conductive material. FIG. 4 shows cross section of rubber keycap 40 with ferrite or other conductive material 42 bound by elastomeric material, such as rubber 41.

As shown in FIG. 5, in an alternative embodiment, the bottom PCB may be designed in such a way that when a key is depressed, the conductive material closes the respective circuit of the key that is depressed. This implementation differs from the first embodiment in that all the relevant circuits are printed on one PCB, without the need for a designed membrane.

In yet another embodiment, the first embodiment is used, except that instead of using a PCB for the bottom layer, a membrane printed with or with attached diodes is used.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A computer keyboard comprising:
   a plurality of keys, each of said keys comprising a keycap, an elastomeric material inserted within said keycap and a key contact embedded in said elastomeric material;
   a printed circuit board comprising PCB contacts associated with each of said key contacts, wherein one or more of said key contacts closes a circuit with said printed circuit board when one of said keys is depressed;
   wherein said printed circuit board further comprises a matrix of conducting lines and a plurality of diodes associated with each of said PCB contacts configured to prevent reverse current, thereby increasing a number of distinct key combinations to be transmitted to a microcontroller;
   wherein said key contact is embedded in said elastomeric material at a bottom edge portion of said keycap to enable said key contact to directly connect to said PCB contact when said key is depressed.

2. The computer keyboard of claim 1, wherein said diodes are p-n diodes.

3. The computer keyboard of claim 1, wherein said diodes are Schottky diodes.

4. The computer keyboard of claim 1, wherein said diodes are step recovery diodes.

5. The computer keyboard of claim 1, wherein said elastomeric material is rubber.

6. The computer keyboard of claim 1, wherein said key contact comprises ferrite.

7. A computer keyboard comprising:
   a plurality of keys, each of said keys comprising a keycap, an elastomeric material inserted within said keycap and a key contact embedded in said elastomeric material; and
   a membrane comprising PCB contacts associated with each of said key contacts, wherein one or more of said key contacts closes a circuit with said membrane when one of said keys is depressed:
   wherein said membrane further comprises a matrix of conducting lines and a plurality of diodes associated with each of said PCB contacts;
   wherein said plurality of diodes are configured to prevent reverse current thereby increasing a number of distinct key combinations to be transmitted to a microcontroller;
   wherein said key contact is embedded in said elastomeric material at a bottom edge portion of said keycap to enable said key contact to directly connect to said PCB contact when said key is depressed.

8. The computer keyboard of claim 7, wherein said diodes are p-n diodes.

9. The computer keyboard of claim 7, wherein said diodes are Schottky diodes.

10. The computer keyboard of claim 7, wherein said diodes are step recovery diodes.

11. The computer keyboard of claim 7, wherein said elastomeric material is rubber.

12. The computer keyboard of claim 7, wherein said key contact comprises ferrite.

\* \* \* \* \*